United States Patent [19]

Belanger

[11] Patent Number: 5,127,123
[45] Date of Patent: Jul. 7, 1992

[54] ROTARY CLOTH ROLL ASSEMBLY
[75] Inventor: James A. Belanger, Northville, Mich.
[73] Assignee: Belanger, Inc., Northville, Mich.
[21] Appl. No.: 209,669
[22] Filed: Jun. 21, 1988

Related U.S. Application Data

[63] Continuation-in-part of Ser. No. 67,999, Jun. 29, 1987, abandoned.

[51] Int. Cl.$^5$ .............................................. B60S 3/00
[52] U.S. Cl. ................................ 15/53.4; 15/181; 15/230.12; 15/230.14; 15/230.16
[58] Field of Search .................. 15/97 R, 97 A, 97 B, 15/DIG. 2, 102, 230, 230.12, 230.14, 230.16, 230.17, 181, 230.19, 21 D, 21 E, 53 B; 51/334, 332, 358, 168, 381

[56] References Cited

U.S. PATENT DOCUMENTS

| | | |
|---|---|---|
| 1,189,798 | 7/1916 | Dillon . |
| 1,217,848 | 2/1917 | Small . |
| 1,753,201 | 4/1930 | Edlich . |
| 1,799,808 | 4/1931 | Bartling ........................ 15/230.16 |
| 2,455,099 | 11/1948 | Seelenfreund . |
| 2,455,680 | 12/1948 | Kaplan . |
| 2,476,537 | 7/1949 | Erickson . |
| 2,539,844 | 1/1951 | Kingsbury . |
| 2,643,493 | 6/1953 | Zimmerman ................. 15/230.16 |
| 3,067,444 | 12/1962 | Dickson et al. . |
| 3,346,895 | 10/1967 | Consolo . |
| 3,724,140 | 4/1973 | Harper ............................. 51/332 |
| 3,733,062 | 5/1973 | Bracich ..................... 261/DIG. 15 X |
| 3,774,259 | 11/1973 | Genaro . |
| 3,823,922 | 7/1974 | McElveath ................ 261/DIG. 15 |
| 3,839,763 | 10/1974 | Gould ............................. 15/181 |
| 3,842,547 | 10/1974 | Belanger ........................ 51/334 |
| 4,577,364 | 3/1986 | Demetriades ............ 15/230.14 X |

FOREIGN PATENT DOCUMENTS

497422 11/1953 Canada .

Primary Examiner—Harvey C. Hornsby
Assistant Examiner—Stephen F. Gerrity

[57] ABSTRACT

A rotary cloth roll assembly for treating the surfaces of the tires on one side of an automobile as it proceeds along a predetermined path of travel comprises a rotary shaft having a longitudinal axis parallel to the path of travel, a positive stop abutment secured to the shaft and a plurality of aligned replaceable cartridges mounted upon the shaft for rotation therewith and bearing against the abutment. Each cartridge includes a series of engaging spacers, with each spacer having at its center an opening generally conforming to the shaft for rotation therewith and for preventing rotation of the spacers relative to the shaft. Each spacer has first and second sides, the first side being generally flat and having an annular groove therein and the second side having thereon a generally rectangular locating shoulder and an annular locating rim. A series of flexible non-woven cloth discs of synthetic fibers are disclosed, each disc having at its center a non-circular opening conforming to the generally rectangular shoulder of the spacers for assembly upon each of the spacer shoulders respectively and rotation therewith and for preventing rotation of the discs relative to the spacers. A removable fastener on the shaft secures the spacers to the shaft with the locating rim on each spacer interlocked with an annular groove of an adjacent spacer and for securing the flexible discs between the spacers. The invention further includes the method of making a cloth roll cartridge.

35 Claims, 4 Drawing Sheets

ROTARY CLOTH ROLL ASSEMBLY

RELATED APPLICATION

This application is a continuation-in-part application of my copending patent application Ser. No. 067,999, entitled "Rotary Repackable Cloth Wheel Assembly," filed Jun. 29, 1987, now abandoned and assigned to the assignee of record.

TECHNICAL FIELD

This invention relates to a rotary cloth roll assembly and more particularly to an improved rotary cloth roll assembly using a plurality of replaceable unit cartridges having non-woven cloth discs of synthetic fibers.

BACKGROUND OF THE INVENTION

My copending patent application relates to a rotary repackable cloth wheel assembly mounted upon a power-rotated shaft and a series of alternate spacers and flexible non-woven cloth discs of synthetic fibrous material. A stop abutment is secured to the shaft adjacent one end retainingly engaging the spacers and discs. On the other end of the shaft, there is employed a fastening means for securing the aligned assembled spacers and cloth discs to and along the shaft. The respective spacers have generally rectangular-shaped openings to fit upon the shaft, also of rectangular cross-section. Likewise, the respective non-woven cloth discs have similar openings so that the individual spacers and discs are secured to the shaft for rotation therewith and are constrained against rotation relative to the shaft.

From time to time as the respective cloth discs or some of them show signs of wear, the complete cloth wheel assembly is disassembled and the worn discs replaced by other cloth discs with the wheel or roll reassembled for further use.

SUMMARY OF THE INVENTION

An important feature of the present invention is to provide an improved rotary cloth roll assembly for treating the surfaces of the tires on one side of an automobile as it proceeds along a predetermined horizontal path of travel. Upon an elongated shaft and retained thereon there are provided a series of aligned replaceable cloth roll cartridges as units with each cartridge including a series of engaging spacers and with a plurality of flexible non-woven cloth discs non-rotatively mounted upon the spacers and rotatable therewith. In the event that some of the cloth discs of a particular cartridge become worn or damaged, the entire cartridge is easily removed from the shaft and replaced with an available new cartridge with a great saving of time, expense and shut-down time.

In my copending patent application, the respective spacers as well as the discs were all mounted upon the shaft in a line and alternated and wherein the central apertures of the spacers and discs were non-circular for registry with a correspondingly shaped shaft. A drive relation was established between the shaft and the spacers and discs at the same time, preventing relative rotation of the spacers and discs with respect to the shaft.

As another feature in the present cartridge construction, a plurality of such unit cartridges are made and stored as replacement cartridges as required from time to time without necessitating replacement of individual discs such as shown in my copending application.

As an important feature for each of the row of cartridges adapted for positioning upon an elongated rotatable shaft, there is provided a positive stop abutment upon the shaft. A series of centrally apertured unit cartridges are assembled onto the shaft and retained in position thereon and for rotation therewith. There is also provided a series of engaging spacers which are mounted upon the shaft. Each spacer has an opening generally conforming to the cross-sectional shape of the shaft and with a suitable means interposed between the shaft and spacers for preventing rotation of the spacers relative to the shaft. A series of flexible non-woven cloth discs of a synthetic fiber material are mounted singly or in groups upon the shoulders of the respective spacers and anchored thereon against relative movement.

As another feature, for each cartridge and for the series of aligned engaging spacers arranged end to end, each spacer has at its center an opening which generally conforms to the cross-section of a portion of the shaft and wherein a portion of the shaft and the corresponding openings within the spacers are non-circular or polygonal such that there is a drive relationship between the shaft and the cartridge including the respective connected spacers.

As another feature, each spacer has first and second sides with the first side being generally flat and with the second side having thereon and extending axially therefrom a non-circular locating shoulder which terminates in a generally flat surface parallel to the first side. The respective flexible non-woven cloth discs, normally in groups of one or more, at their centers have non-circular openings corresponding to the non-circular shoulder on the spacers for assembly onto the spacer shoulders and for rotation therewith and at the same time preventing rotation of the discs relative to the spacers.

As an important feature, various means may be employed for establishing a non-rotative relation between the shaft and the corresponding spacers, such as a non-circular opening in the spacer and a corresponding non-circular shape upon the shaft, or a circular shaft with a circular opening in the spacer and a key upon the shaft fitting within a corresponding key slot in the respective spacers. The spacers are locked upon the shaft for rotation therewith, and rotation of the spacers with respect to the shaft is prevented.

As another feature, each of the respective engaging spacers upon the flat surface of its second side has applied thereto an adhesive so that, upon the complete assembly of the respective spacers and the cloth discs mounted thereon and the application of pressure, there is provided a unit cartridge wherein the respective spacers are axially secured together with the corresponding pairs, sets or groups of cloth discs non-rotatively mounted upon the shoulders of the corresponding spacers and anchored between the adjacent spacers against rotation relative to the spacers.

As another feature, the first side of each spacer has an axially located aperture therein and, corresponding thereto upon the second side of the spacer, there is an axially directed projection or rim adapted to cooperatively nest within the locating recess of an adjacent spacer to thereby align the non-circular openings of the respective spacers.

An important feature of the present invention includes the method of making a cloth roll cartridge of the aforementioned type for use in a cloth roll assembly.

These and other features and objects will be seen from the following specification and claims in conjunction with the appended drawings.

It will be understood that the above drawings illustrate merely preferred embodiments of the invention, and that other embodiments are contemplated within the scope of the claims hereafter set forth.

DETAILED DESCRIPTION OF A PREFERRED EMBODIMENT

Figure 1:
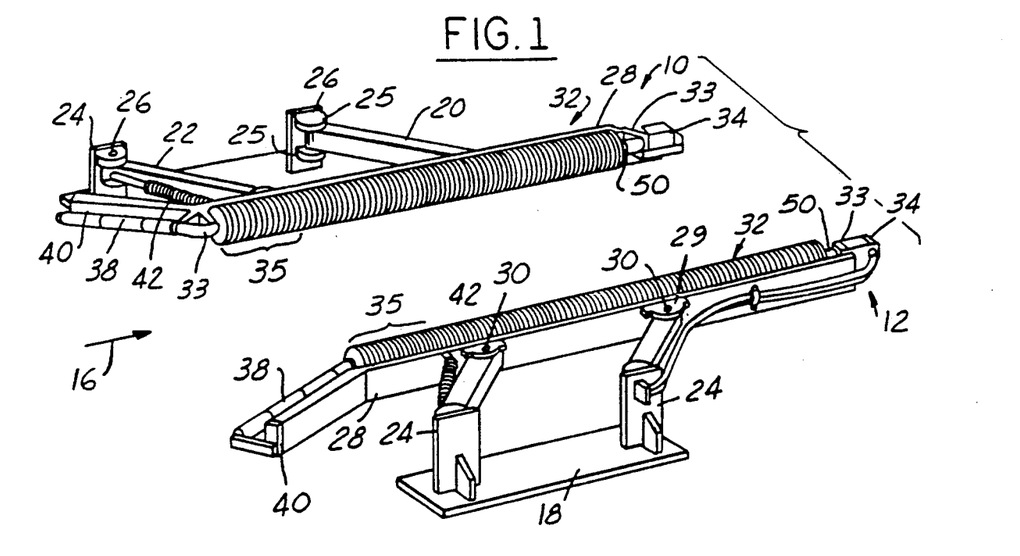
FIG. 1 is a perspective view of a tire washer apparatus employing the rotary cloth roll assemblies, each with a plurality of replaceable cloth roll cartridges.
Figure 2:
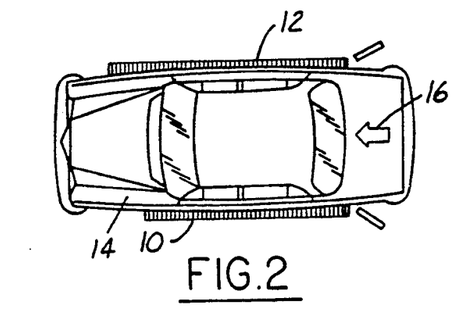
FIG. 2 is a plan view of the tire washer apparatus showing the rotary cloth roll assemblies in operative engagement with the tires of a vehicle.

Referring now to the drawings, there is provided a pair of laterally spaced-apart tire washers or apparatuses, indicated at 10 and 12 respectively, between which a vehicle 14 (FIG. 2) is directed to pass either by means of a conveyor (not shown) or driven under its own power, along the path and in the direction of travel indicated by the arrow 16.

Each tire washer apparatus 10, 12 is typically carried on a fixed support or base 18 which may be bolted or otherwise anchored to the floor of the car wash. Each tire washing apparatus 10, 12 includes a pair of arms 20 and 22. Each support 18 includes a pair of upstanding brackets 24 which are spaced longitudinally apart. The brackets 24 are provided with bearings 25 for mounting a vertical pivot shaft 26 which carries the opposite ends of the corresponding arm or linkage 20 and 22.

Each apparatus 10, 12 further includes an elongated roll support 28 having mounting means including the bearings 29 and vertical pivot shafts 30 for connecting the roll support 28 to the other ends of the arms 20 and 22, as best illustrated in FIG. 1.

The roll assembly supports or holders 28 are provided with suitable bearings 33 or end plates for mounting the small diameter-elongated rotary cloth roll assembly 32. The ends of the roll assembly 32 are supported in the conventional manner by end plates or bearings 33. A hydraulic motor 34 has a suitable drive connection to the end portion of the roll assembly 32 as is now provided in the art where a rotary brush with bristles is employed.

The hydraulic motor 34 is connected to a source of hydraulic fluid, not shown, in a conventional manner. The actuation of the fluid motor 34 is effective to rotate the rotary cloth roll assembly 32.

A source of water and cleaning material (not shown) may be connected to each apparatus 10, 12 and is communicated to a series of jet nozzles, now shown, which are arranged along the path at spaced-apart intervals. Such nozzles may be directed forwardly towards the tire or to the rotating cloth roll assembly 32.

Each apparatus 10, 12 has a roller 38 mounted on a bracket 40 connected to the roll support 28. In operation, the front tire of the vehicle 14 initially engages the rollers 38 as the vehicle or automobile enters the car wash. A spring or extension mechanism 42 is interposed between the base support bracket 24 and the cloth roll assembly holder 28 in order to bias and urge the units 10 and 12 towards the center of the path of travel of the vehicle.

As the vehicle enters the car wash, the leading tires engage the rollers 38 so as to urge the units 10 and 12 apart against the bias of the spring mechanism 42. At the same time, a cleaning solution, polishing material or other substance is directed towards the vehicle tires or towards the roll assemblies 32 in order to clean, polish or otherwise treat the side surfaces of the tires. Once the last tire exits the units or apparatuses 10, 12, they will return to their normal extended position shown in FIG. 1 solely by gravitational pull as is known in the art or by springs 42.

It is important that the small-diameter, elongated, low-profile cloth roll assemblies not damage, scratch or otherwise mar the aluminum, magnesium or metal roll covers or hubcaps. Thus, it is necessary to avoid using conventional rotary brushes with bristles which can scratch, mar or damage the roll covers should contact be made therebetween.

The present invention has corrected the problem by providing a rotary cloth roll assembly 32. Each roll assembly 32 consists of an elongated shaft 50 having a longitudinally extending axis 52, a plurality of flexible cloth discs 74, a plurality of spacers 72 and the fastening mechanism 104 for removably mounting the discs 74 and spacers 72 on the shaft 50.

The foregoing general description is set forth in my copending patent application Ser. No. 067,999 filed Jun. 29, 1987.

Figure 6:
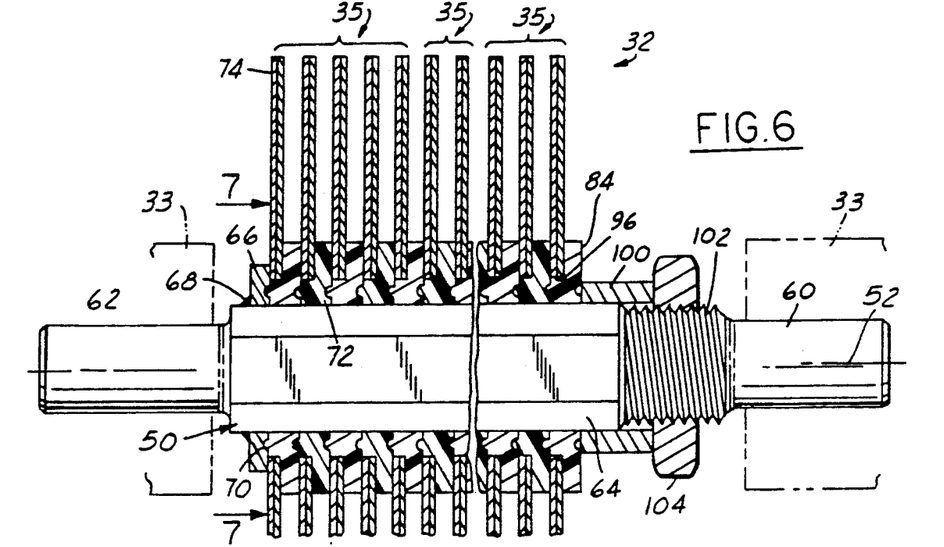
FIG. 6 is a fragmentary broken away and sectioned elevational view of a rotary cloth roll assembly utilizing a plurality of cloth roll cartridges as mounted upon a power-driven shaft.
Figure 7:
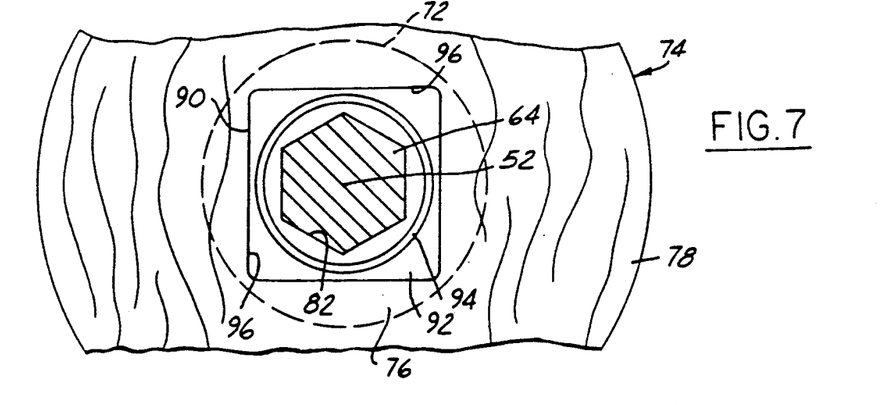
FIG. 7 is a fragmentary section taken in the direction of arrows 7—7 of FIG. 6.

Specifically, the shaft 50 includes end portions 60 and 62 which are generally circular in cross-section nested within the bearings 33, fragmentarily shown. Shaft 50 includes an elongated intermediate shaft portion 64 which is of non-circular cross-section. Preferably, the cross-section of the intermediate shaft portion 64 is rectangular, square or hexagonal as is shown in FIGS. 6 and 7. Shaft portion 64 may be solid or of a tubular construction as shown at 112, FIG. 10.

The shaft 50, FIG. 6, is provided with a positive stop abutment 66 adjacent the intermediate portion 64 and the shaft portion 62. The abutment 66 may be formed as a part of the shaft 50 or may consist of an element which is sleeved onto shaft portion 64 and welded thereto at 68. The abutment 66 forms a positive stop for the replaceable cartridges 35, which include a series of discs 74 and spacers 72 mounted upon the shaft 50.

Each cloth disc 74 is a synthetic non-woven needle punch product which is stamped from a non-woven synthetic fibrous material. The synthetic fibers are bound together by a needle punch process used on a needling machine. An example of such material is made from polyester fibers, though not limited thereto. Such material is preferably provided with a polysaturant and has a weight when dry of 32 ounces per yard for illustration. The discs 54 are punched or stamped from the synthetic fibrous cloth material now used with a friction curtain apparatus for washing and cleaning cars. The punched flexible non-woven synthetic fibrous discs 74 have a generally circular configuration. The discs 74 includes an annular inner-zone 76, an annular outer-zone 78, and a centrally located non-circular opening 96, FIGS. 6 and 7 of generally rectangular cross-section. The disc 74 has a diameter of eight inches, approximately, and a thickness of 3/32 inch, approximately. The opening 96 is a 2¼ inch square opening, approximately.

It has been found that the use of the flexible, non-woven, synthetic cloth discs, with or without the saturant, extends the useful life of the cloth roll assembly and in addition assists in bringing out a high gloss or polish in the tires. The cloth roll assembly is adapted to be used with low-profile wheels and cleans, polishes or otherwise treats the surfaces of the tires, both blackwall and whitewall. In some applications, the cloth discs of the cloth roll assembly may serve as an applicator for a product called "ARMOR-ALL" (a registered trademark of McKesson Corporation) to clean and brighten a tire. It has further been found that the cloth material with the polysaturant will pick and hold approximately 100 percent of its weight. Such a material has a sponge effect. Thus, the polyester fiber cloth material previously described, having a dry weight of 32 ounces per yard, is capable when wet of carrying an additional 32 ounces of water per yard.

The positive stop abutment 66 welded to the shaft at 68 upon one side thereof has an annular locating groove 70. A plurality of unit spacers 72 made of a suitable plastic material, such as polystyrene, though not limited thereto, are applied end to end over the central portion 64 of the shaft 50.

Figure 3:
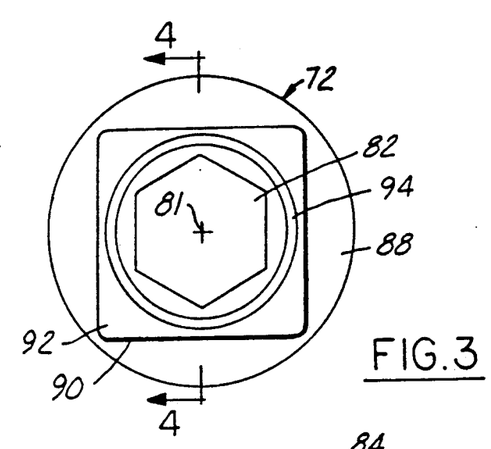
FIG. 3 is a front elevational view of one side of the spacers employed in making up the individual cloth roll cartridges shown in FIG. 13.
Figure 4:
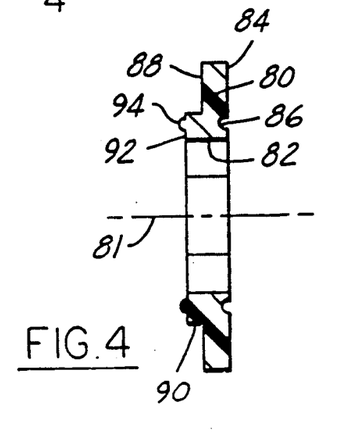
FIG. 4 is a section taken in the direction of arrows 4—4 of FIG. 3.

Each spacer 72 is of a unit construction and includes a body 80, FIG. 4, having a central opening 82 arranged upon central longitudinal axis 81. Opening 82, as in FIG. 3, is polygonal in shape and hexagonal in illustrative embodiment in order to conform to the polygonal shape of the intermediate portion 64 of shaft 50, FIGS. 6 and 7. In the preferred embodiment, the central openings 82 of the engaging spacers 72 is non-circular in order to match a corresponding non-circular shape of the intermediate portion 64 of the shaft 50 registering with its longitudinal axis 52, FIG. 6.

Figure 5:
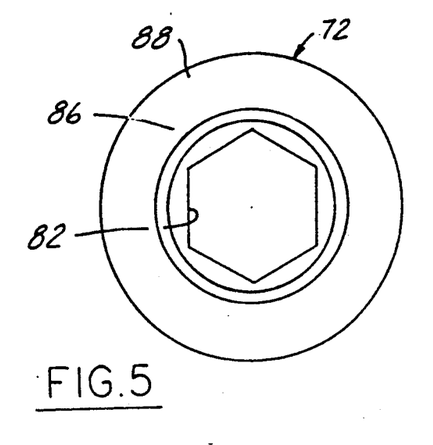
FIG. 5 is a side elevational view of the spacer shown in FIG. 4.

Spacer body 80 has a first side 84 which is flat. Annular locating recess 86 is formed within the first side 84 coaxially of axis 81, FIGS. 4 and 5. The body 80 has a second side 88 which terminates in a laterally extending locating shoulder 90 which is preferably square or rectangular in cross-sectional shape. The shoulder 90 terminates in the transverse flat surface 92, FIG. 3, and includes coaxially of axis 81 the annular locating rim or projection 94. Rim 94, with respect to the first spacer 72 shown in FIG. 6, is adapted for registry within a corresponding annular recess 70 within the stop abutment 66. Each of the other locating rims 94 upon the transverse flat surfaces 92 are adapted for corresponding registry within a corresponding annular locating recess 86 within an adjacent spacer.

In the illustrative embodiment, the spacer opening 82 is hexagonal for registry with the corresponding hexagonal cross-sectional shape of the intermediate portion 64 of shaft 50, FIG. 6. In the illustrative embodiment, FIG. 6, the respective discs 74 are arranged in groups of two or more discs such as the pair of discs shown at 74, FIG. 6. The central opening 96 of the respective flexible non-woven cloth discs 74 of a synthetic fiber is non-circular, rectangular or square for cooperative registry over the corresponding locating shoulder 90 upon each of the respective spacers 72.

The discs 74, one or more, such as shown in FIG. 6, are assembled over the locating shoulder 90 of spacers 72 and have a non-circular opening therein adapted to rotate in unison with the spacer 72 and prevent the discs from rotation relative to the spacer 72.

Figure 13:
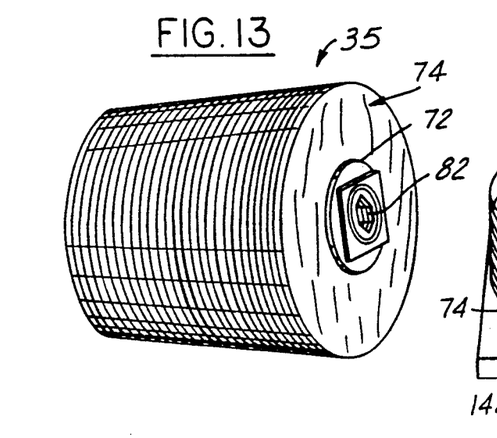
FIG. 13 is a front perspective view of the completed cloth roll cartridge of which a plurality are shown in making up the complete cloth roll assembly shown in FIGS. 1, 6 and 10.
Figure 14:
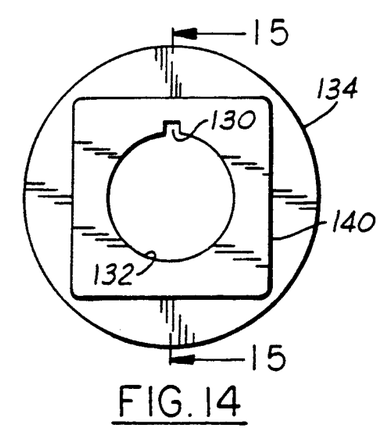
FIG. 14 is a front elevational view of another modified spacer.
Figure 15:
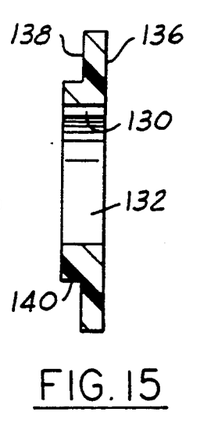
FIG. 15 is a cross-sectional view of the modified spacer taken on the line 15—15 of FIG. 14.
Figure 16:
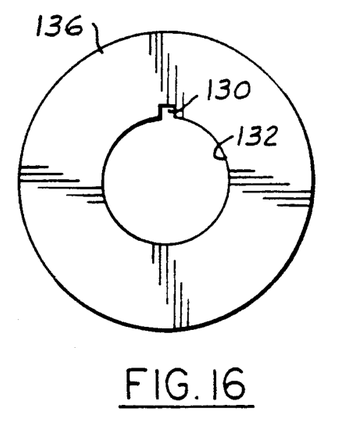
FIG. 16 is a right-side elevational view of the spacer shown in FIG. 15.

The present cloth roll assembly 32 consists of a series of aligned replaceable cartridges 35, shown as a unit in FIG. 13, with a plurality of the cartridges 35 assembled end to end upon the shaft 50 and retained thereon by the sleeve 100. The sleeve 100 extends over the end of intermediate shaft portion 64, over a portion of the threads 102 and is retained thereon by the fastener 104.

Figure 12:
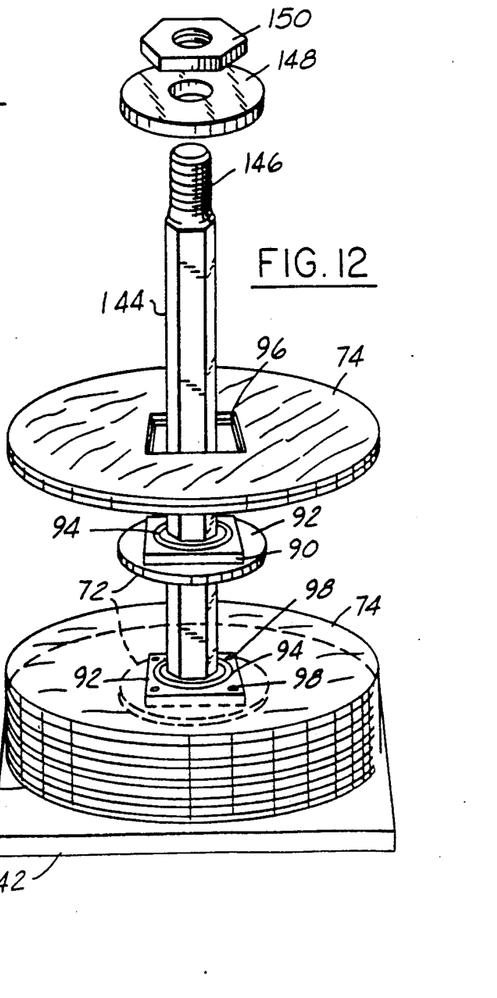
FIG. 12 is a front perspective and exploded view of the mandrel as used for making the cloth roll cartridge of FIG. 13.

In the making up of the respective cartridges 35 employing the mandrel 144 shown in FIG. 12, hereafter described in detail, as each of the spacers 72 are assembled onto the mandrel 144 a layer of adhesive 98 is applied to the flat surface 92 outwardly of the locating rim 94 of each spacer 72. Thus, in the assembly operation, the cloth discs 74 are assembled onto the locating shoulders 90 of the respective spacers 72, and the spacers 72 are assembled end to end upon the mandrel 144. In accordance with the present method of assembly in making the individual cartridges 35, a layer of adhesive 98 is applied upon one disc surface 92 in engagement with the corresponding surface of first side 84 of an adjacent disc. Thus, in the plurality of cartridges 35 employed, the respective spacers 72 are in engagement with each other and are effectively secured together by the use of the adhesive 98 therebetween.

The FIG. 6 illustration of the present cloth roll assembly 32 shows a plurality of cartridges 35 or assemblies of spacers and discs, fragmentarily shown as applied to and along the intermediate portion 64 of shaft 50, and when completed are secured thereon by the fastener or nut 104 and the spacer 100. As shown in FIG. 6, the corresponding locating rims 94 of one spacer 72 fit within the locating annular recess 86 of an adjacent spacer 72 in the unit assembly of the spacers completing the assembly of the cartridge 35 of FIG. 13.

Figure 8:
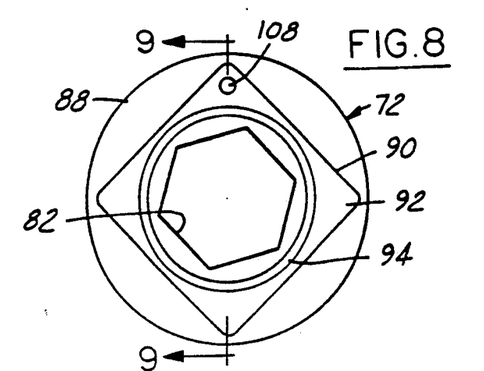
FIG. 8 is a side elevational view of a modified spacer shown in FIGS. 3-5 inclusive.
Figure 9:
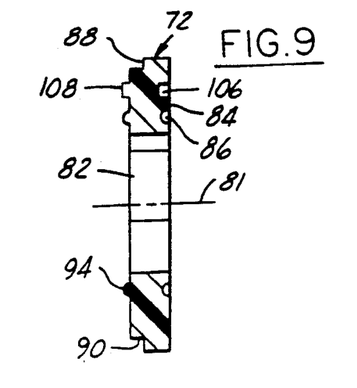
FIG. 9 is a section taken in the direction of arrows 9—9 of FIG. 8.

Since the respective spacers 72 have non-circular central openings 82 in the illustrative embodiment as hexagonal, there is an advantage in aligning the apertures 82 of adjacent spacers. This is further achieved by the locating axial recess 106, FIG. 9, formed within the first side 84 of the modified spacer outwardly of recess 86. Upon the opposite side of the modified spacer and formed within end flat surface 92 of the locating shoulder 90 is a corresponding axial projection 108. As shown in FIG. 8, axial projection 108 is in radial registry with the corresponding adjacent corner of the locating shoulder 90. The axial projection 108 in the modified spacer of FIG. 9 is adapted for cooperating and nesting registry within the corresponding locating axial recess 106 of a next adjacent spacer.

Figure 10:
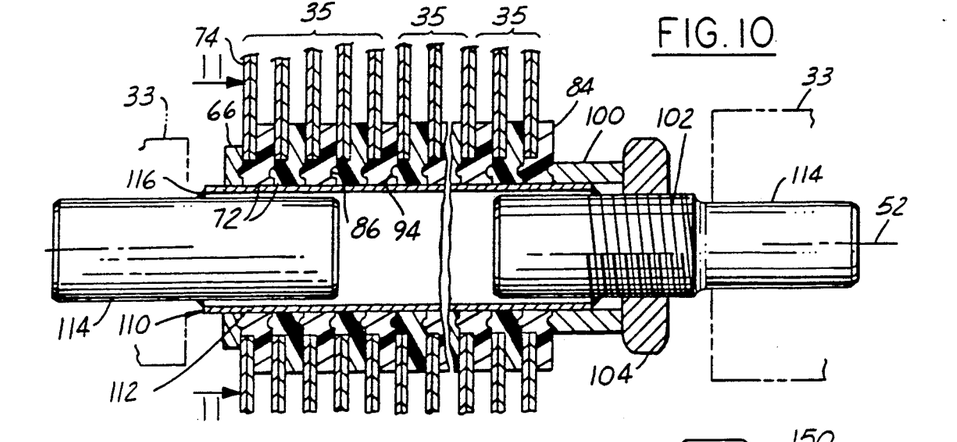
FIG. 10 is a fragmentary section of a rotary cloth roll assembly similar to FIG. 6 but showing a modified shaft including a hollow tubular portion with solid end portions and a series of cartridges thereon.
Figure 11:
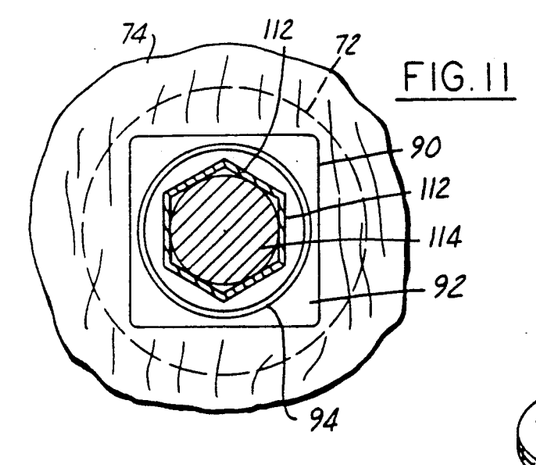
FIG. 11 is a fragmentary section taken in the direction of arrows 11—11 of FIG. 10.

The modified cloth roll assembly shown in FIG. 10 includes a series of unit cartridges 35, FIG. 13, assembled along the length of the shaft 110. Shaft 110 includes an intermediate tubular portion 112 which is non-circular in cross-section and in the illustrative embodiment is hexagonal in order to receive the corresponding hexagonal openings 112 within the respective spacer 72. The shaft 110 includes a pair of solid shafts 114 which project into opposite end portions of the intermediate hollow shaft 112, upon axis 52, and are secured thereto as by the welds 116.

The construction of the respective cartridges 35 and their assembly of a plurality of such cartridges upon and along the shaft 110 is the same as above-described with respect to FIG. 6. The first cartridge 35 at its one end bears against the abutment stop 66. The end cartridge 35 is retained by the spacer 110 which extends partly over the end of the intermediate portion 112, over the threads 102 and is compressively retained thereon by the fastener or nut 104.

A further modified cloth roll assembly 118 is shown FIGS. 14–18 wherein the rotative shaft 120 has an intermediate portion 122 which is round and terminates in a pair of end portions 124 similarly round and normally supported or journaled within the bearings 33, fragmentarily shown. The intermediate portion 122 upon one side portion has a longitudinal slot 126 within which is nested the radially projecting key 128, FIG. 17. The key 128 is adapted for assembly within the corresponding radial key slots 130 arranged outwardly of the central opening 132 of the modified spacer 134. Here, the central opening 132 is circular for cooperative registry with the circular intermediate portion 122 of the shaft. The elongated key 128 projects into the key slots 130 and is effective to establish a drive relation between the shaft 120 and the adjacent engaging spacers 134 shown end to end in FIG. 17.

Spacer 134 has a first side 136 which is flat and a second side 138 parallel thereto from which projects axially from the shoulder 140 which is square or rectangular in cross-section and in the illustrative embodiment is square. In the assembly of the respective discs 74 onto the locating shoulders 140 of the spacers 134 in this embodiment a single and thicker disc 74 is employed. As above described, the corresponding aperture 96 within the central portion of the disc 74 is square, in order to cooperatively and non-rotatively register with the locating shoulder 140 of the spacer 134 for rotation therewith and for preventing relative rotation of the cloth disc 74 with respect to the spacer 134.

Figure 17:
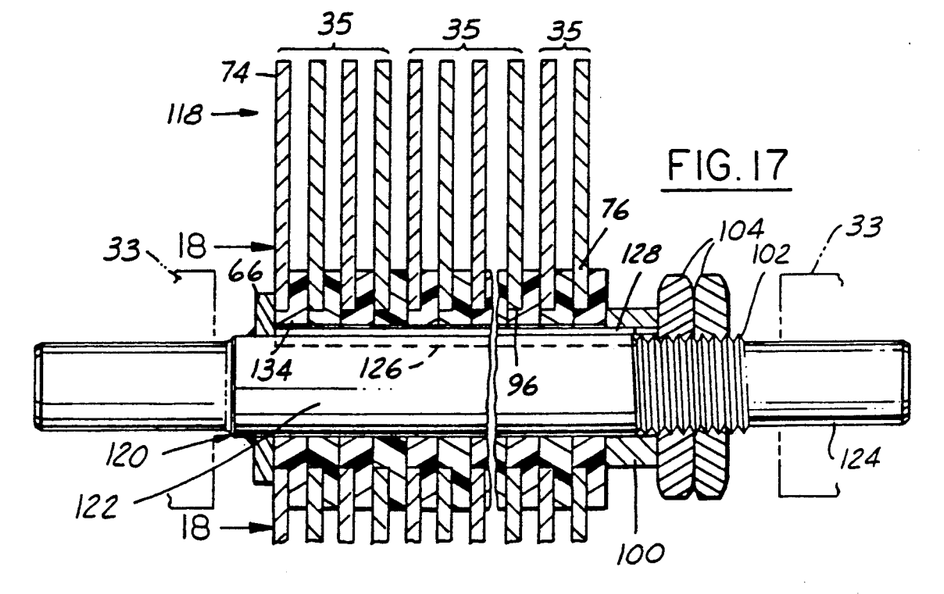
FIG. 17 is a fragmentary longitudinal section of a modified cloth roll assembly utilizing the spacers of FIGS. 14-16.
Figure 18:
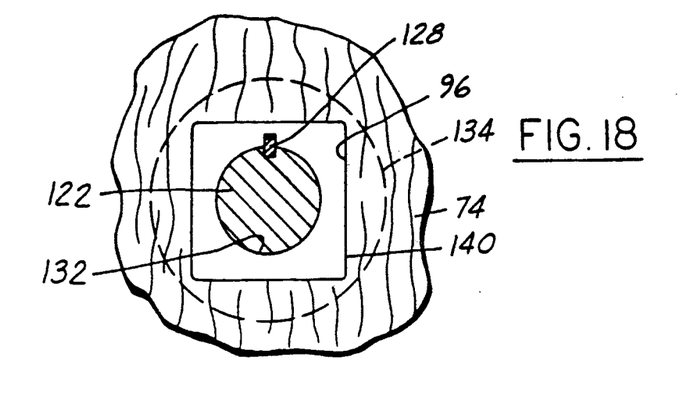
FIG. 18 is a fragmentary section taken in the direction of arrows 18—18 of FIG. 17.

Here also, as above described, with respect to FIGS. 6 and 10, the respective cartridges 35 have a series of spacers 134 which are arranged end to end in an engaging relation and attached together by a layer of glue such as shown at 98 in FIG. 12. The series of thickened and single non-woven cloth discs 74 are assembled upon the respective locating shoulders 140 of the spacers 134, and in the assembly, FIGS. 13 and 17, are retained between the respective spacers 134.

As to the first disc 74, the central portion 76 thereof is adapted for registry with a portion of the abutment stop 66 to assure its snug assembly, and the cartridge 35, of which a series are fragmentarily illustrated. It is contemplated that the end disc 74 at its central region 76 could be adhered to the first spacer by a layer of adhesive such as shown at 98 FIG. 12.

The completed assembly of the respective spacers 134 and discs 74 onto the shaft 120 is maintained by the tubular spacer 100 and the pair of fasteners or nuts 104 upon the threaded portion 102 of the shaft end 124.

METHOD OF MAKING CLOTH ROLL CARTRIDGES

Referring to the apparatus shown in FIG. 12, a series of cartridges 35 as units are applied to the respective rotative shaft 50, a single cartridge as a unit being shown in FIG. 13 after completion of the method of making such roll cartridge.

The present method of making a cloth roll cartridge 35 includes the following steps:

a. taking a plurality of spacers 72, each spacer having a body 80 of generally circular configuration, a first side 84 and a second side 88 wherein the first side is flat, there being an axially located opening 82 extending through the body between the first and second sides and wherein the first side has an annular groove 86 and the second side has a generally rectangular shoulder 90 extending therefrom and terminating in a flat surface 92 with an annular rim 94 projecting from the flat surface;

b. taking discs 74 of flexible non-woven synthetic fibers and having a central opening 96;

c. placing a spacer 72, with the first side 84 facing downwardly, on an upstanding mandrel 144 including a support base 142 and wherein the mandrel in the illustrative embodiment is non-circular in cross-section such as hexagonal;

d. for the embodiment shown in FIGS. 6 and 10, placing a pair of cloth discs 74 over the upwardly facing shoulder 90 of the preceding spacer 72;

e. placing adhesive 98 on the inwardly facing surface 92 of the spacer near its rim;

f. taking another spacer 72, FIG. 12, aligning the opening 82 thereon with the mandrel 144 and assembling the groove 86 thereon onto the rim 94 of the preceding spacer;

g. repeating the steps of placing a pair of discs 74 over the upstanding spacer shoulders 90 and placing glue 98 on the upper surfaces thereof for the next disc and successively repeating steps (c) through (f) until the stack of spacers 72 and discs 74 is at a predetermined height; and h. applying pressure to the stack employing a washer 148 over the last spacer 72 and assembling a nut 150 over the threaded end 146 of the mandrel 144 and tightening to apply axial pressure to the stack of discs 72 for securing the discs 72 together and providing a unit cloth roll cartridge 35 such as shown in FIG. 13. The height or length of a cartridge is eighteen inches, and five such cartridges are used in an assembly 32.

It is contemplated in use that the ultimate user of the present rotary cloth roll assemblies 32, as illustrated in FIG. 6, 10 and 17, will have on hand in storage a series of the cartridges 35 so that if a particular cartridge includes one or more discs that are worn, deformed or damaged, the entire cartridge 35 may be removed from the shaft 50 and replaced with a new cartridge as shown in 35, FIG. 13.

While in my copending application I disclose the respective spacers and discs are alternated along the length of the shaft and mounted directly upon the shaft, in the current embodiment the respective spacers are arranged end to end and retained upon the shaft with the corresponding cloth discs individually or in groups mounted upon the spacers.

The primary objective is to achieve a completed rotary cloth roll assembly 32 which is made up of a series of unit replaceable cartridges 35, FIG. 13, which are assembled upon the primary rotative shaft and retained thereon between the respective bearings 33, as illustratively shown in FIGS. 6, 10 and 17.

Each cartridge 35 may be packed and shipped in a carton which is easily lifted and transported.

Having described my invention, reference should now be had to the following claims.

I claim:

1. In an automobile tire wash system having a rotary cloth roll assembly for washing the surfaces of the tires on one side of an automobile as it proceeds along a predetermined horizontal path of travel, comprising:

an elongated rotary shaft having a longitudinally extending axis adapted to be arranged parallel to the path of travel of the automobile, said shaft having a pair of end portions and an elongated intermediate portion of non-circular cross-section having intersections with said end portions;

a positive stop abutment secured to said shaft adjacent the intersection of said intermediate portion and one of said end portions;

a series of engaging spacers mounted upon said intermediate portion with the first spacer bearing against said abutment;

each spacer having a center, a non-circular opening therein at said center generally conforming to the non-circular cross-section of said intermediate portion of said shaft for assembly upon the shaft along said axis for rotation therewith;

means interposed between said intermediate portion of said shaft and said spacers for preventing rotation of said spacers relative to said shaft;

each spacer having first and second sides, said first side being generally flat;

said second side having thereon and extending axially therefrom a non-circular locating shoulder terminating in a generally flat surface parallel to said first side;

a series of flexible non-woven cloth discs of synthetic fibers, each disc comprising a unitary, relatively thin, generally cylindrical body having a circumferential outer periphery and having at its center a non-circular opening therein generally conforming to the non-circular shoulder on a spacer for assembly upon each of said spacer shoulders respectively for rotation therewith and for preventing rotation of said cloth discs relative to said spacers;

said discs being disposed so that the circumferential outer periphery of each cylindrical body comes in contact with the surfaces of the tires:

fastening means on the other end portion of said shaft for securing the spacers to said abutment and to said shaft thereby retaining the flexible discs between said spacers; and power operated means for rotating said shaft to thereby cause the cylindrical outer peripheries of said discs to be rotated against the surfaces of the tires as the automobile proceeds along said path.

2. An automobile tire wash system of claim 1, further comprising said flexible non-woven cloth discs being arranged in engaging pairs, and with said pairs of discs receiving and mounted upon the spacer shoulders respectively of each spacer and interposed between adjacent spacers to provide a cloth roll assembly of generally uniform density.

3. An automobile tire wash system of claim 1, further comprising said flexible non-woven cloth discs being arranged in pairs of discs, with each pair of discs being separated by a spacer to provide a cloth roll assembly of a generally uniform density.

4. An automobile tire wash system of claim 1, further comprising a layer of adhesive between opposing engaging faces of adjacent spacers.

5. An automobile tire wash system of claim 1, further comprising the first of said cloth discs axially bearing against said positive stop abutment.

6. An automobile tire wash system of claim 1, further comprising the intermediate portion of said shaft being of hexagonal cross-section; and the openings in said spacers being of hexagonal shape.

7. An automobile tire wash system of claim 1, further comprising the intermediate portion of said shaft being a tube of polygonal cross-section;

the openings in said spacers being of a matching polygonal shape;

said end portions of said shaft including a pair of spaced aligned stud shafts within and projecting axially outward of the ends of said intermediate portion and welded thereto.

8. An automobile tire wash system of claim 1, further comprising said fastening means being removable and including threads provided on said other end portion adjacent said intermediate portion;

a compression sleeve with a pair of end surfaces upon one end of the intermediate portion of said shaft, with one end surface engaging the adjacent spacer; and a nut applied to said threads and engaging the other end surface of said sleeve, for securing the spacers on said shaft and against said abutment.

9. An automobile tire wash system of claim 1, further comprising a locating axial recess within the first side of each spacer radially outward of its opening; and there being a correspondingly located axial projection upon the flat surface of said locating shoulder, cooperatively nested within the locating recess of an adjacent spacer, thereby aligning the openings of said spacers.

10. An automobile tire wash system of claim 1, further comprising the locating shoulder upon each spacer and the opening of each disc being rectangular.

11. An automobile tire wash system of claim 10, further comprising a locating axial recess within the first side of said spacer radially outward of its opening;

there being a correspondingly located axial projection upon the flat surface of said locating shoulder, cooperatively nested within the locating recess of an adjacent spacer, thereby aligning the openings of said spacers;

said axial projection being radially aligned with one corner of said shoulder.

12. An automobile tire wash system of claim 1, further comprising said shaft end portions being of circular cross-section and said intermediate portion being of non-circular cross-section.

13. An automobile tire wash system of claim 12, further comprising said means interposed between said shaft and spacers including each of said spacers having at its center a non-circular opening receiving said intermediate portion.

14. An automobile tire wash system of claim 13, further comprising said spacer shoulder being generally rectangular, said disc openings being generally rectangular.

15. An automobile tire wash system of claim 1, further comprising said first side of each spacer having an annular groove therein surrounding said axis; and an annular locating rim projecting from the flat surface upon the second side of said spacer for mating with the groove in an adjacent spacer.

16. An automobile tire wash system of claim 1, further comprising said means interposed between said shaft and spacer including a longitudinal key secured upon the intermediate portion of said shaft, each spacer having a circular opening and a radial key slot for assembly upon said shaft and in registry with said key.

17. An automobile tire wash system of claim 1, further comprising said fibers being polyester fibers.

18. In an automobile tire wash system having a rotary cloth roll assembly for washing the surfaces of the tires on one side of an automobile as it proceeds along a predetermined horizontal path of travel, comprising:

an elongated rotary shaft of circular cross-section having a longitudinal axis parallel to the path of travel, said shaft having a pair of end portions and an elongated intermediate portion of non-circular cross-section between the end portions;

a longitudinal key secured upon said intermediate portion;

a positive stop abutment secured to said shaft adjacent the intersection of said intermediate portion and one of said end portions;

a series of engaging spacers mounted upon said intermediate portion with the first spacer bearing against said abutment;

each spacer having at its center a circular opening therein generally conforming to the non-circular cross-section of said intermediate portion of said shaft and a radial key slot for assembly upon the shaft along said axis and in registry with said key for rotation with said shaft and for preventing rotation of said spacers relative to said shaft;

each spacer having first and second sides, said first side being generally flat;

said second side having thereon and extending axially therefrom a generally rectangular locating shoulder terminating in a generally flat surface parallel to said first side;

a series of flexible non-woven cloth discs of synthetic fibers, each disc comprising a unitary, relatively thin, generally cylindrical body having a circumferential outer periphery and having at its center a rectangular opening therein generally conforming to the generally rectangular shoulder on a spacer for assembly upon each of said spacer shoulders respectively for rotation therewith and for preventing rotation of said cloth discs relative to said spacers;

said discs being disposed so that the circumferential outer periphery of said cylindrical body comes into contact with the surfaces of the tires;

fastening means on the other end portion of said shaft for securing the spacers against said abutment and to said shaft for retaining the flexible discs between said spacers; and power operated means for rotating said shaft to thereby cause the cylindrical outer peripheries of said discs as they are rotated against the surfaces of the tires as the automobile proceeds along said path.

19. An automobile tire wash system of claim 18, further comprising said discs being arranged in pairs of discs, with each pair of discs being separated by a spacer, to provide a cloth roll assembly of a generally uniform density.

20. An automobile tire wash system of claim 18, further comprising a layer of adhesive between opposing engaging faces of adjacent spacers.

21. An automobile tire wash system of claim 18, further comprising said fastening means being removable and including threads provided on said other end portion adjacent said intermediate portion;

a compression sleeve with a pair of end surfaces upon one end of the intermediate portion of said shaft, with one end surface engaging the adjacent spacer; and a nut applied to said threads and engaging the other end surface of said sleeve, for securing the spacers on the shaft and against said abutment.

22. An automobile tire wash system of claim 18, further comprising said shoulder being square; and said cloth disc having a square opening therein for registry with said shoulder.

23. A unit cloth roll cartridge for a tire washer apparatus used in a car wash system comprising:

a series of aligned coaxial engaging spacers, each spacer having a unitary body having a centrally extending axis, said body having first and second sides, the first side being generally flat, there being a centrally located opening extending through the body along said axis between said sides;

said second side having thereon and extending therefrom a shoulder extending away from said second and first sides, terminating in a generally flat surface parallel to said first side;

a plurality of flexible non-woven cloth discs of synthetic fibers, each disc comprising a unitary, relatively thin, generally cylindrical body having a circumferential outer periphery and having at its center an opening therein conforming to the shoulder of said spacers and assembled onto said shoulders respectively and secured thereon against rotation relative to said shoulder;

central portions of said cloth discs being interposed between and coaxially supported by said spacers, the remaining outer portions of said cloth discs being unsupported in the direction of said centrally extending axis and spaced axially apart, defining spaces;

a layer of adhesive interposed between opposing faces of adjacent spacers and interconnecting adjacent spacers along their length;

said spacer openings being aligned and defining an axial bore through the cartridge;

an elongated rotatable shaft having a longitudinal axis and extending through the axial bore of the cartridge;

a positive stop abutment secured to said shaft adjacent one end thereof;

a plurality of said cartridges being arranged end to end and mounted upon said shaft, and with the first cartridge bearing against said stop abutment;

interlocking means between said cartridges and said shaft for rotation in unison and for preventing rotation of said cartridges relative to said shaft; and fastening means upon and adjacent the other end of said shaft retainingly engaging the adjacent cartridge for anchoring all of said cartridges relative to said stop abutment and with respect to said shaft for rotation therewith.

24. In the cloth roll cartridge of claim 23, further comprising said cloth discs being arranged in pairs, and with said pairs of cloth discs received and mounted upon the spacer shoulders of each spacer.

25. In the cloth roll cartridge of claim 23, further comprising said flexible non-woven cloth discs being arranged in pairs of discs, with each pair of discs being separated by a spacer and mounted upon the shoulder of the corresponding spacer.

26. In the cloth roll cartridge of claim 23, further comprising the first side of each spacer having an annular groove surrounding said axis, and an annular locator rim projecting from the flat surface of said shoulder;

said rims adapted from interlocking nesting into the grooves of adjacent spacers.

27. In the cloth roll cartridge of claim 23, further comprising a locating axial recess within the first side of each spacer; and a corresponding locating axial projection upon the flat surface of said shoulder, cooperatively nested within the locating recess of an adjacent spacer, thereby aligning the central openings of said spacers.

28. In the cloth roll cartridge of claim 23, further comprising said disc opening and said spacer shoulder being of generally rectangular configuration.

29. An automobile tire wash apparatus having a rotary cloth roll assembly for cleaning the surfaces of the tires on one side of an automobile as it proceeds along a predetermined horizontal path of travel, comprising:

an elongated rotary shaft having a longitudinal axis parallel to the path of travel, said shaft having a pair of end portions and an elongated intermediate portion between the end portions;

a positive stop abutment secured to said shaft adjacent the intersection of said intermediate portion and one of said end portions;

a plurality of replaceable unit cloth roll cartridges arranged end to end and mounted upon said shaft with a corresponding longitudinal axis in alignment, and with the first cartridge bearing against stop abutment;

each of said unit cloth roll cartridges having a series of aligned coaxial engaging spacers, each spacer having a unitary body having a centrally extending axis, said body having first and second sides, the first side being generally flat with a centrally located opening extending through the body along said axis between said sides;

said second side having thereon and extending therefrom a generally non-circular shoulder extending away from said second and first sides, terminating in a generally flat surface parallel to said first side;

a plurality of flexible non-woven cloth discs of synthetic fibers, each disc having at its center a generally non-circular opening therein conforming to the shoulder of a spacer and assembled onto said shoulders respectively and secured thereon against rotation relative to said shoulders;

central portions of said cloth discs be interposed between and coaxially supported by said spacers, the remaining outer portions of said cloth discs being unsupported in the direction of said centrally extending axis and spaced axially apart, defining spaces; and a layer of adhesive interposed between opposing faces of adjacent spacers and interconnecting adjacent spacers of each cartridge along their length;

said spacer openings being aligned defining an axial bore through the cartridges and through which said shaft extends;

interlocking means between said cartridges and said shaft for rotation in unison and for preventing rotation of said cartridges relative to said shaft; and fastening means upon and adjacent the other of said end portions of said shaft retainingly engaging the adjacent cartridge for anchoring all of said cartridges relative to said stop abutment and with respect to said shaft for rotation therewith.

30. An automobile tire wash system of claim 29, further comprises said flexible non-woven cloth discs being arranged in pairs of discs, with each pair of discs being separated by a spacer to provide a cloth roll assembly of a generally uniform density.

31. An automobile tire wash apparatus of claim 29, further comprising said cloth discs being arranged in engaging pairs, and with said pairs of cloth discs received and mounted upon the spacer shoulders of each spacer.

32. An automobile tire wash apparatus of claim 29, further comprising said flexible non-woven cloth discs being arranged in groups of one or more discs, with each group being separated by a spacer and mounted upon the shoulder of each spacer.

33. An automobile tire wash apparatus of claim 29, further comprising the first side of each spacer having an annular groove surrounding said axis, and an annular locator rim projecting from the flat surface of said shoulder;

said rims adapted from interlocking nesting into the grooves of adjacent spacers.

34. An automobile tire wash apparatus of claim 29, further comprising a locating axial recess within the first side of each spacer; and a corresponding locating axial projection upon the flat surface of said shoulder, cooperatively nested within the locating recess of an adjacent spacer, thereby aligning the central openings of said spacers.

35. An automobile tire wash apparatus of claim 29, further comprising said disc opening and said spacer shoulder being of generally rectangular configuration.

* * * * *